No. 842,484. PATENTED JAN. 29, 1907.
C. W. MERRILL.
PRESSURE FILTER.
APPLICATION FILED MAR. 28, 1905.
4 SHEETS—SHEET 2.
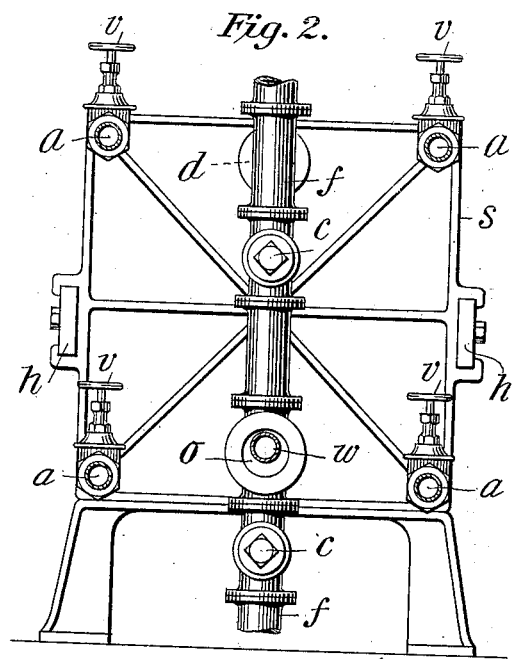
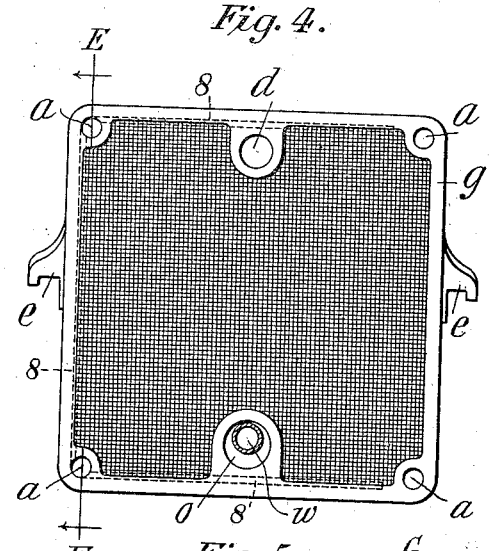
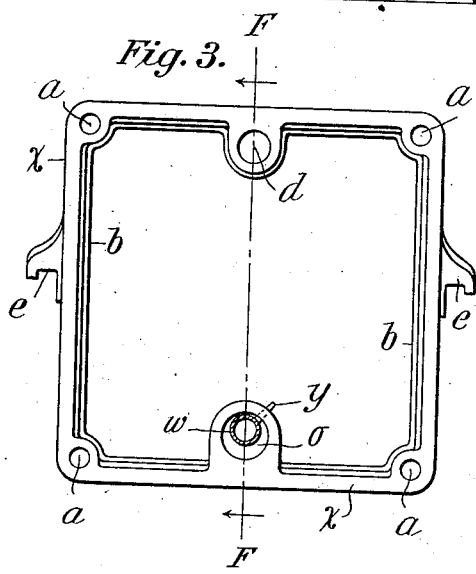
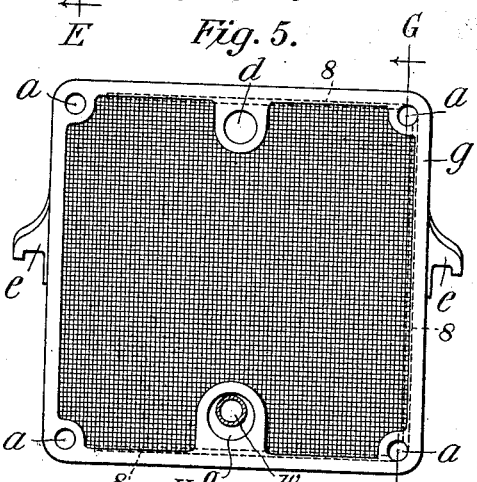
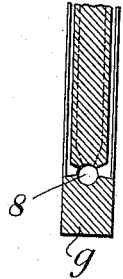
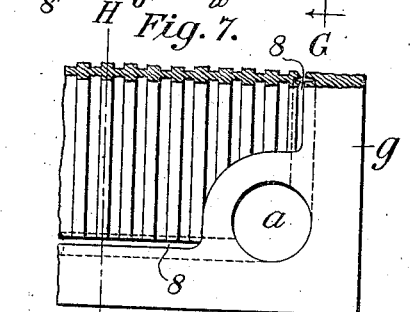
WITNESSES:
C. E. Ashley
Charles Engel
INVENTOR
Charles W Merrill
By his Attorney,
Millard Parker Butler

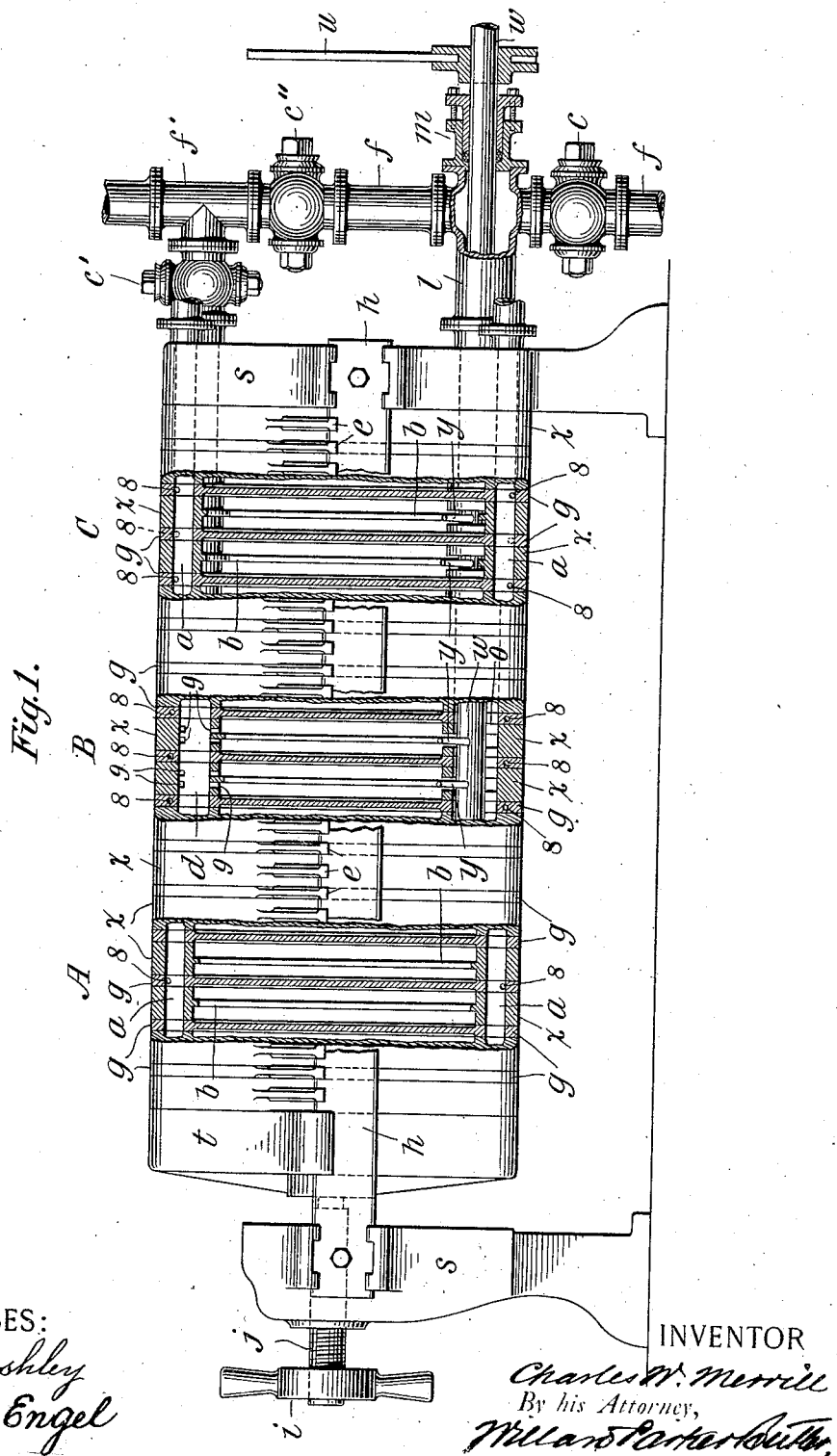

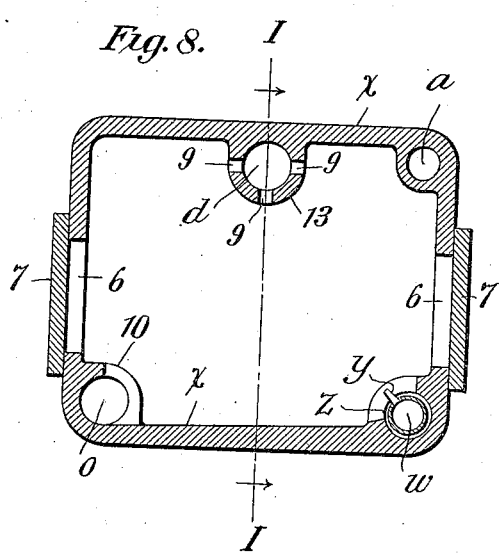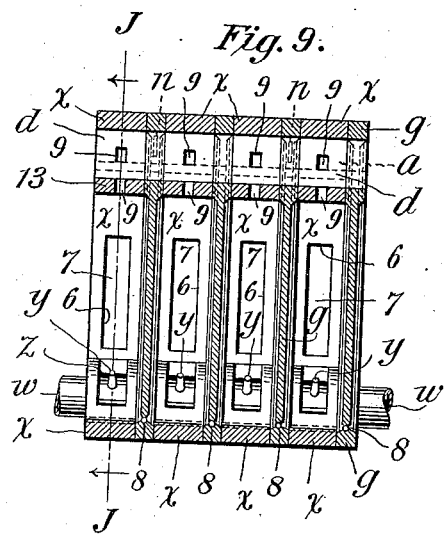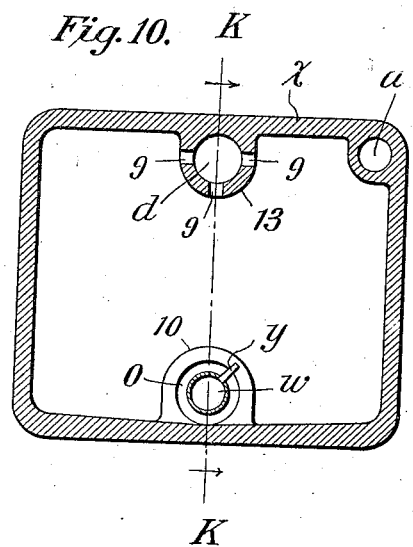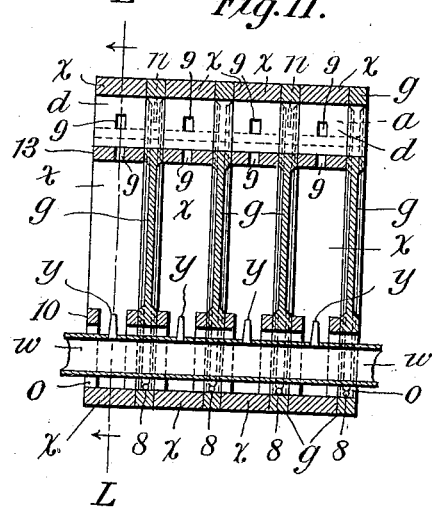

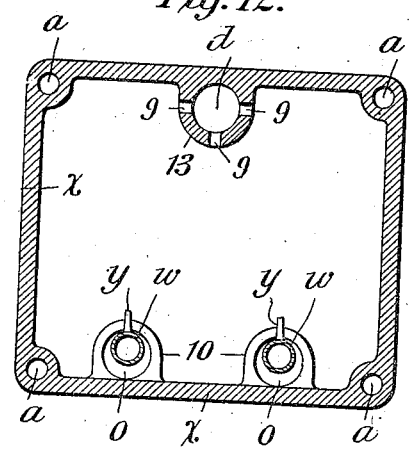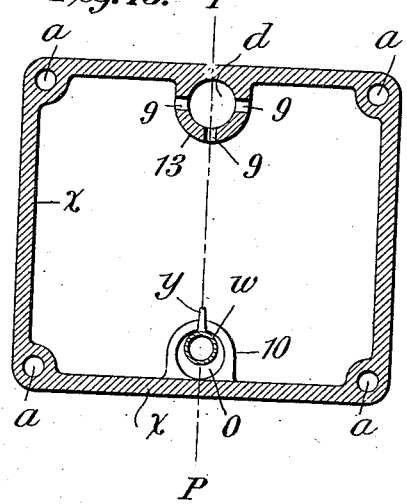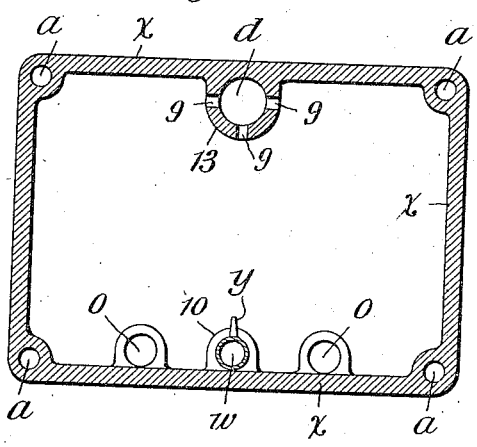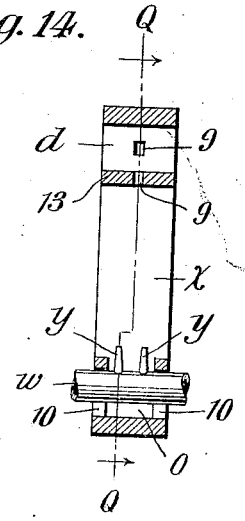

UNITED STATES PATENT OFFICE.

CHARLES W. MERRILL, OF LEAD, SOUTH DAKOTA.

PRESSURE-FILTER.

No. 842,484.     Specification of Letters Patent.     Patented Jan. 29, 1907.

Application filed March 28, 1905. Serial No. 252,524.

*To all whom it may concern:*

Be it known that I, CHARLES W. MERRILL, a citizen of the United States, and a resident of Lead, county of Lawrence, South Dakota, have invented a new and useful Improvement in Pressure-Filters, of which the following is a specification.

My invention relates to improvements in apparatus for separating unfilterable material from a mixture of filterable and unfilterable matter, and it particularly relates to improvements in pressure-filters in which the separation and treatment of such material is effected.

The primary object of my invention is to facilitate and cheapen the removal from the containers or filter-presses of the material which will not pass through the filtering medium.

A further object is to permit of the independent introduction of cleansing, precipitating, or other material to the containers.

A further object is to effect a rapid removal of the unfilterable material which accumulates in the containers of the press without separating the units of the press.

In the operation of filter-presses or similar filters it is customary to separate the units of which each press is composed and remove the solid, semisolid, or unfilterable material from the distance-frame or container separately, usually by hand. This method is naturally expensive, as the wear and tear on the filtering medium covering the filter-plates is heavy and the time so occupied during which the press cannot be used for filtering greatly reduces its capacity per unit of time. Hence the scope of the ordinary filter-press is limited to the separation of solids from liquids to cases where the value of such materials is such as to permit of the expenses outlined above. Furthermore, the necessity of removing the filtered material from each distance-frame separately results in the use of deep distance-frames in order to increase their separate capacity. Moreover, the resultant thick cake of solid or semisolid material increases the pressure necessary to accomplish the filtering, and thus adds another factor to the cost of operating said filter-presses. Now I have discovered that where a container is used in a filter-press of the ordinary character, which container is provided with a direct inlet for the cleansing medium and a direct outlet for the mixture, that when the two are so placed with reference to each other that they are no longer opposite to each other then the contents may be efficiently discharged without separating the units of the filter-press.

The present application is a continuation in part of application Serial No. 188,474, filed by the present applicant on January 11, 1904, which was allowed, but subsequently forfeited.

The invention will be best understood by reference to the accompanying four sheets of drawings, in which—

Figure 1 is an elevation of a filter-press sectioned in three different planes indicated by the letters A, B, and C, A being sectioned on the line E E of Fig. 4, B on the line F F of Fig. 3, and C on the line G G of Fig. 5. Fig. 2 is an end view of the apparatus. Fig. 3 is a vertical end view of one form of container. Fig. 4 and Fig. 5 are end views of one of the filter-plates, showing the grooves through which the discharge of the filtrate is effected, somewhat differently arranged in each figure. Fig. 6 is a vertical cross-section on the line H H of Fig. 7 of one end of one of the filter-plates, showing the grooves through which the discharge is effected. Fig. 7 is an enlarged front view of one end of the filter-plate shown in Fig. 5. Fig. 8 is a vertical cross-section on the line J J of Fig. 9 of one of the improved forms of container. Fig. 9 is a vertical cross-section on the line I I of Fig. 8 of a series of the same containers put together. Fig. 10 is a vertical section of a still different form of improved container on the line L L of Fig. 11. Fig. 11 is a vertical longitudinal section on the lines K K of Fig. 10 of a series of such modified form of container put together. Fig. 12 is a similar vertical section showing two inlet-pipes, two nozzles, and two outlet-channels from each container. Fig. 13 is a similar vertical section on the line Q Q of Fig. 14, showing two inlet-nozzles and a single outlet from each container. Fig. 14 is a vertical section of the form of container shown in Fig. 13 on the line P P of said figure. Fig. 15 is a vertical section of a container having a single pipe provided with one nozzle and with two outlets from each container.

Similar letters refer to similar parts throughout all the views.

In Fig. 1 of the drawings, *s* represents the standards at either end of the filter-press; *h*, the frame of the press. *j* is a screw which forces the end *t* forward in the frame by means of the handles $i$. $x\ x$ are the exterior frames of the series of containers, and $g\ g$ are the filter-plates. All of these devices and parts are common to the ordinary form of filter-presses.

In Figs. 1 and 2 a filter-press is shown of what is called the "closed-delivery" type as distinguished from the "open-delivery" type. In the former type the filtrate is discharged into a suitable channel within the filter-press, whereas in the open-delivery system the filtrate from each filter-plate is discharged through a special opening into a trough or other receptacle for collecting the same on the exterior of the press.

In the construction of containers shown in Figs. 1, 8, 9, 10, 11, 12, 13, 14, and 15, $x$ is the frame of the container, which may be in cross-section of any convenient shape. 6 6 are openings in the sides. $o$ is an opening or outlet at one side through which the solid, semisolid, or unfilterable material, hereinafter for convenience called the "precipitate," is removed from the containers and which when a series of containers are put together in a filter-press makes a continuous opening through the press, which is closed at the ends in any convenient manner and discharges into any suitable receptacle. $a$ is a corresponding inlet for treating the precipitate in place with liquids, vapors, or gases and which is preferably placed at either or both upper corners of the container and in like manner forms a continuous opening or openings when the containers are placed together in the filter-press. $d$ is an inlet through which the material to be filtered is introduced, which inlet is of the same general character and becomes continuous when the containers are put together in the filter-press and is provided with the openings 9 9 9, from which the material is introduced into the chamber. $w$ is a supply pipe or channel through which the liquid vapor or gas is introduced under pressure for the purpose of removing the precipitate. This is provided with a nozzle, slit, or hole $y$, which enters into each container. $g$ is the filter-plate which is introduced between the containers. 7 is a gate which is used to close the openings 6 6.

In the second construction (shown in Figs. 10 and 11) the opening $o$, which corresponds to $o$ in the structure shown in Figs. 2 and 3, is placed within the container and contains in its interior the supply-pipe $w$, fixed or rotative, which corresponds to the pipe $w$ in Fig. 2, and like it it is provided with nozzles $y\ y$, similar to the nozzles $y\ y$ in Fig. 3, which pass into each container, a series of these being employed as in the previous construction. $d$ represents the inlet through which the material to be filtered is introduced, which corresponds to the inlet $d$ in Figs. 2 and 3. The filter-plate, which forms no part of this invention, but is shown here for the purpose of describing the operative machine, is preferably of the construction shown in Figs. 4, 5, 6, and 7. This is provided with one or more openings $a$, through which the liquids, vapors, or gases pass and which, with the corresponding opening in the containers, form a continuous opening or openings when the containers are placed, together with the plates, in the filter-press. $d$ is a corresponding inlet through which the material to be filtered is introduced, which inlet is of the same general character as that in the containers and becomes continuous when the various parts are put together in the filter-press. The filtrate from the plates passes into the grooves 8 and thence may be discharged either from each plate separately by what has heretofore been referred to as the "open-delivery" system, or it may be discharged into the opening $a$, as shown in Figs. 1, 4, 5, and 6. When four openings $a$ are provided in the filter-plate, as shown in Figs. 4 and 5, the container has of necessity to be of the form shown in Fig. 3 and provided with similar openings $a$.

The continuous passage $d$ terminates, as shown in Fig. 1, in vertical pipes $f''$, which connect upwardly therefrom, as shown at one end of the pipe $d$. In the construction shown control is effected by the valves $c'$ and $c^2$, respectively. The pipe $w$ emerges through a stuffing-box $m$, and its movement is controlled by a handle $u$ or in any other convenient manner. The containers and filter-plates are supported on the arm by the lugs $e$, as shown in Figs. 1 and 2. For the purpose of effecting the discharge of the contents of the containers after the cleansing material is introduced the arrangement of the pipes shown in Fig. 1, which effects the discharge by means of suction, may be employed. In this figure, $l$ is the main discharge-pipe, which traverses the filter-press horizontally at the bottom. $f''$ represents one or more vertical pipes connecting downwardly therefrom, which may be placed, as shown, at one end of the pipe $l$. The flow through this pipe or pipes is controlled by the valve or valves $c$. The effect of opening the valve $c$ is to cause the pulp in the pipe $l$ to suction downward, and thus prevent the accumulation thereof within the channel $o$ and leave the pipe $w$ free to be rotated by the handle $u$.

The method of operating the pressure-filter when any one of the aforesaid types of containers is used is as follows: For the purpose of charging the material to be filtered, consisting of a liquid, gas, or vapor and a semisolid, solid, or unfilterable material, for convenience called the "precipitate," into the containers the valve $c$ in the outlet-pipe is closed, the valve $c^2$ is also closed, and the valve $c'$ is opened, and the material enters through the pipe $d$ at the top of the containers. When it is desired, which is sometimes, but not often, the case, to charge the filter at the bottom, the valve $c'$ is closed, and the valve $c^2$ is opened, and the material to be charged in this case passes in through the pipe $l$. The material is brought into the containers $x$ through the channels $d$. The plates $g\ g\ g$ are covered with filtering material, which completes the closure of the containers $x$ so far as the unfilterable material is concerned, while the liquid, gas, or vapor passes through the filtering medium and out through the grooves 8 in the plates $g$ either into the continuous channel $a$ in the case of a closed discharge, as shown in the Fig. 1, or by suitable stop-cocks into a trough in the case of an open discharge. The unfilterable contents of the containers $x$ are deposited upon the plates $g$ and may be then leached or treated while in place by forcing liquid or gas through it, which vapor or gas may be introduced either by means of the inlets $d$ or $a$, the latter having slits $n$, leading into alternate filter-plates and behind the filtering medium, as shown in Figs. 9, 11, and 14. When the desired treatment of the precipitate in the containers has been completed and it is ready to be removed, the valve $c$, which closes the pipe $l$, in which the openings $o$, Figs. 1, 2, 3, 4, 5, 8, 9, 10, 11, 12, 13, 14, and 15, is or are opened, and liquid, vapor, or gas under pressure is introduced through the pipe $w$ and from the pipe $w$ through the nozzles $y$, and the precipitate is removed through the channel $o$ by suction or the outlet 11 by gravity alone. The outlets are then closed, and the pressure-filter is again ready for charging and treating the mixture of liquid, gas, or vapor and solid, semisolid, or unfilterable material.

I do not limit myself to any desired form of delivery, but employ open or closed delivery, as may be desired or found most convenient.

In practice the rotative pipe is provided with suitable nozzles, slits, or openings of any convenient length, shape, or size through which the liquid, vapor, or gas is introduced into each of the containers under pressure at any desired angle for the purpose of washing out or removing the unfiltered component. The sizes of the nozzles and their positions may vary from time to time as may be deemed best. In Figs. 8 to 11, inclusive, a single nozzle $y$ is shown in pipe $w$ entering into each chamber. They are all placed at the same angular plane; but the plane of various nozzles or discharge-openings may vary one as regards each other from time to time, as may be found convenient. Thus, for example, two or more nozzles or openings may be employed with respect to each container arranged to discharge the washout medium at different angles with respect to each other, or in case of wide containers two or more nozzles in line with each other and in parallel planes may be employed, the precise arrangement and construction of the nozzles, slits, or openings and their size and position varying from time to time, as may be found desirable. The pipe $w$ may be rotated through any arc from zero to three hundred and sixty degrees and may be reversed back through the same arc, or it may be arranged to be rotated continuously through the complete circle in one direction, as may be found most convenient. Any number of nozzles may be used in connection with any one container, and they may be placed at the same or different angles and may be used singly or in pairs or in any desired numbers or location.

I am aware that pressure-filters have been long in use for separating liquid gas or vapor from solid, semisolid, or unfilterable material; also, that the solid, semisolid, or unfilterable material has been treated while in place in the pressure-filter by liquid, vapor, or gas under pressure as above outlined and by other methods, and I do not claim these features.

I claim as my invention—

1. In a pressure-filter the combination with suitable filter-plates, of a container provided with a direct opening through which a cleansing medium may be introduced in any desired direction into the space within the container.

2. In a pressure-filter the combination with suitable filter-plates, of a container provided with a direct opening through which a cleansing medium may be introduced in any desired direction, into the space within the container, and with a direct outlet through which the mixture of cleansing medium and unfilterable component is discharged.

3. In a pressure-filter the combination with suitable filter-plates, of a container provided with a direct opening through which a cleansing medium may be introduced in any desired direction, into the space within the container and a direct outlet connecting with a channel in the wall of the container through which the mixture of cleansing medium and unfilterable component is discharged.

4. A pressure-filter comprising with suitable filter-plates a series of containers each provided with a direct opening through which a cleansing material may be introduced in any desired direction, into the space within the containers.

5. A pressure-filter comprising with suitable filter-plates a series of containers each provided with a direct opening through which a cleansing material may be introduced in any desired direction, into the space within the containers, and with a direct outlet through which the mixture of cleansing medium and unfilterable component is discharged.

6. A pressure-filter comprising with suitable filter-plates a series of containers each provided with a direct opening through which a cleansing material may be introduced in any desired direction, into the space within the containers, and with a direct outlet connecting with a channel in the wall of the container through which the mixture of cleansing medium and unfilterable component is discharged.

7. The combination in a pressure-filter with suitable filter-plates, of a container provided with a direct outlet and a rotative pipe provided with devices whereby a cleansing medium may be introduced under pressure into the space within the container and the unfilterable component within the container discharged.

8. The combination in a pressure-filter with suitable plates and containers of a rotative pipe provided with devices whereby a cleansing medium may be introduced through the pipe and the contents of the pressure-filter discharged.

9. The combination in a pressure-filter, with suitable filter-plates of a series of containers each provided with a direct outlet and rotative pipe provided with devices whereby a cleansing medium may be introduced under pressure into each of the spaces within the container and the unfilterable component within the container discharged.

10. A pressure-filter comprising with suitable filter-plates a series of containers, each provided with a direct opening and a rotative pipe provided with devices whereby a cleansing material may be introduced in any desired quantities and directions, by means of said opening into the space within the containers.

11. A pressure-filter comprising with suitable filter-plates a series of containers, each provided with a direct opening and a rotative pipe provided with devices whereby a cleansing material may be introduced in any desired direction, by means of said opening into the space within the containers and through which the mixture of cleansing medium and unfilterable component is discharged.

12. A pressure-filter comprising with suitable filter-plates a series of containers, each provided with a direct opening and a rotative pipe provided with devices whereby a cleansing material may be introduced in any desired direction, by means of said opening into the space within the containers and a direct outlet connecting with a channel in the wall of the container through which the mixture of cleansing medium and unfilterable component discharges.

13. The combination in a pressure-filter with suitable filter-plates, of a container provided with a direct outlet forming when the containers and plates are put together in series an outlet-channel; and a pipe provided with devices whereby a cleansing medium may be introduced under pressure into the space within each container, and the unfilterable component discharged.

14. The combination in a pressure-filter with suitable filter-plates of a series of containers, each provided with a direct outlet forming, when the containers are put together with the plates in series an outlet-channel; and a pipe provided with a series of devices whereby a cleansing medium may be introduced under pressure into the space within each container and the unfilterable component discharged from the interior through the outlet-channel.

15. The combination in a pressure-filter with suitable filter-plates, of a series of containers, each provided with an opening so connected as to form when the containers and plates are put together a channel within the filter-press connected with each container, and a pipe placed within said channel provided with devices whereby a cleansing medium may be introduced under pressure into the space within each container and the unfilterable component within each container discharged through said channel.

16. The combination in a pressure-filter with suitable filter-plates, of a container provided with a direct outlet forming when the containers are put together with the plates in series, an outlet-channel; and a rotative pipe provided with devices whereby a cleansing medium may be introduced under pressure into the space within the container, and the unfilterable component within the container discharged.

17. The combination in a pressure-filter with suitable filter-plates of a series of containers each provided with a direct outlet forming when put together with the plates an outlet-channel; and a rotative pipe provided with devices whereby a cleansing medium may be introduced under pressure into the space within each of the containers and the unfilterable component within the container discharged from the interior through the outlet-channel.

18. The combination in a pressure-filter with suitable filter-plates of a series of containers each provided with a direct outlet; and a rotative pipe within said outlet provided with devices whereby a cleansing medium may be introduced under pressure into the space within each of the containers, and the unfilterable component within the container discharged.

19. The combination in a pressure-filter with suitable filter-plates, of a container provided with a direct outlet from the container; and a rotative pipe within said outlet provided with devices whereby a cleansing medium may be introduced under pressure into the space within the container, and the unfilterable component within the container discharged.

20. The combination in a pressure-filter with suitable filter-plates of a series of containers each provided with a direct outlet forming when put together with the plates an outlet-channel; and a rotative pipe placed within said outlet-channel provided with devices whereby a cleansing medium may be introduced under pressure in any desired direction into the space within each of the containers and the unfilterable component within the container discharged from the interior through the outlet-channel.

21. The combination in a pressure-filter with suitable filter-plates, of a container provided with a direct inlet through which the material to be filtered may be introduced into the space within the same; a direct outlet from the container; and a pipe, provided with a series of devices whereby a cleansing medium may be introduced under pressure into the spaces within the container and the unfilterable matter ejected therefrom.

22. The combination in a pressure-filter, with suitable filter-plates of a series of containers each provided with a direct inlet through which the material to be filtered may be introduced into the space within the containers; a direct outlet from each container; and a pipe, provided with a series of devices whereby a cleansing medium may be introduced under pressure into each of the spaces within the containers and the unfilterable matter ejected from the interior.

23. The combination in a pressure-filter with suitable filter-plates, of a container provided with an opening so connected as to form when the containers are put together in series, a continuous channel within the filter-press, opening into each container; and a pipe placed within said channel provided with a device whereby a cleansing material may be introduced under pressure into the interior of the container and the unfilterable material ejected therefrom.

24. The combination in a pressure-filter, with suitable filter-plates of a series of containers each provided with a series of openings so connected as to form when the containers are put together a continuous channel within the filter-press opening into each container, and a pipe placed within said channel provided with a series of devices whereby a cleansing material may be introduced under pressure into each of the spaces within the containers and the unfilterable material ejected from the interior.

25. The combination in a pressure-filter with suitable filter-plates, of a container provided with a direct inlet through which the material to be filtered may be introduced into the space within the same; a direct outlet, forming when the containers are put together in series an outlet-channel; and a pipe provided with a device whereby a cleansing medium may be introduced under pressure into each container, and the unfilterable matter ejected therefrom.

26. The combination in a pressure-filter, with suitable filter-plates of a series of containers each provided with a direct inlet through which the material to be filtered may be introduced into the space within the containers; a direct outlet from each container, forming when put together an outlet-channel; and a pipe provided with a series of devices whereby a cleansing medium may be introduced under pressure into each of the spaces within the containers and the unfilterable matter ejected from the interior into the outlet-channel.

27. The combination in a pressure-filter with suitable plates, of a container provided with a plurality of direct outlets forming when the containers and plates are put together in series, a like number of outlet-channels, and pipes provided with devices whereby a cleansing medium may be introduced under pressure into the space within each container, and the unfilterable component discharged.

28. The combination in a pressure-filter with suitable filter-plates, of a series of containers, each provided with a plurality of direct outlets, each forming, when the containers are put together with the plates in a series, a like number of outlet-channels, and pipes provided with a series of devices whereby a cleansing medium be introduced under pressure into the space within the container, and the unfilterable component discharged from the interior through the outlets.

29. The combination in a pressure-filter with suitable filter-plates, of a container provided with a direct outlet, forming, when the containers and plates are put together in series, an outlet-channel, and a pipe placed within the outlet-channel, provided with devices whereby a cleansing medium may be introduced under pressure into the space within each container and the unfilterable component discharged.

30. The combination in a pressure-filter with suitable filter-plates, of a series of containers each provided with a direct outlet, forming when the containers are put together with the pipes in a series, an outlet-channel, and a pipe placed within said channel, provided with a series of devices whereby a cleansing medium may be introduced under pressure into the space within each container, and the unfilterable component discharged from the interior through the outlet-channel.

31. The combination in a pressure-filter with suitable filter-plates, of a container provided with a plurality of direct outlets, forming, when the containers and plates are put together in series, a like number of outlet-channels, and a pipe placed in each outlet-channel; provided with devices whereby a cleansing medium may be introduced under pressure into the space within each container and the unfilterable component discharged.

32. The combination in a pressure-filter with suitable filter-plates, of a series of containers, each provided with a plurality of direct outlets, forming, when the containers are put together with the plates in series, a like number of outlet-channels, and a pipe placed within each outlet-channel, provided with a series of devices whereby a cleansing medium may be introduced under pressure into the space within each container and the unfilterable component discharged from the interior through the outlet-channel.

In testimony that I claim the foregoing as my invention I have signed my name, in presence of two witnesses, this 24th day of January, 1905.

CHARLES W. MERRILL.

Witnesses:
GEO. D. FOGLESONG,
WM. FRACKELTON.